(12) United States Patent
Reimann

(10) Patent No.: US 6,960,856 B2
(45) Date of Patent: Nov. 1, 2005

(54) ELECTRIC MOTOR HAVING A MULTIPOLE ROTOR AND A MULTIPOLE STATOR

(75) Inventor: Christian Reimann, Wehrheim (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/459,987

(22) Filed: Jun. 13, 2003

(65) Prior Publication Data

US 2003/0230950 A1 Dec. 18, 2003

(30) Foreign Application Priority Data

Jun. 17, 2002 (DE) .......................... 102 26 976

(51) Int. Cl.$^7$ .......................... H02K 21/12; H02K 5/10; H02K 5/22
(52) U.S. Cl. .......................... 310/156.28; 310/87; 310/88
(58) Field of Search .......................... 310/43, 85–89, 310/156.12–156.14, 156.28–156.31

(56) References Cited

U.S. PATENT DOCUMENTS

| | | | | |
|---|---|---|---|---|
| 3,754,844 A | * | 8/1973 | Nusser et al. .......... | 417/423.12 |
| 4,227,108 A | | 10/1980 | Washizu et al. | |
| 5,034,643 A | * | 7/1991 | Trian .......................... | 310/215 |
| 5,698,917 A | * | 12/1997 | Shultz .......................... | 310/87 |
| 5,801,470 A | * | 9/1998 | Johnson et al. ......... | 310/156.27 |
| 5,923,108 A | * | 7/1999 | Matake et al. ................. | 310/89 |
| 5,964,028 A | * | 10/1999 | Buse .......................... | 29/598 |
| 6,060,805 A | * | 5/2000 | Ohtake et al. ................. | 310/87 |
| 6,097,125 A | * | 8/2000 | Park et al. ............. | 310/156.45 |
| 6,359,353 B1 | * | 3/2002 | Bevington .................... | 310/87 |
| 6,614,140 B2 | * | 9/2003 | Uemura et al. ......... | 310/156.12 |

FOREIGN PATENT DOCUMENTS

| | | |
|---|---|---|
| BE | 756853 | 9/1970 |
| DE | 520808 | 2/1931 |
| DE | 1931661 | 1/1971 |
| DE | 1763760 | 1/1972 |
| DE | 19846489 A1 | 4/2000 |
| GB | 2 345 387 A | 7/2000 |
| WO | WO 01/84609 A2 | 11/2001 |

OTHER PUBLICATIONS

Derwent Abstract –De 198 46 489A1: Apr. 13, 2000; Mannesmann VDO AG, D–60388 Frankfurt (Germany).
Abstract –DE 1 763 760; Jan. 13, 1972; Hanning Elektro–Werke Robert Hanning, D–4800 Bielefedl (Germany).
Abstract –DE 520 808; Mar. 14, 1931; Dipl.–Ing. Harry Sauveur, D–Hannover (Germany) and Dipl.–Ing. Walter Fiebig, D–Hannover–Wülfel (Germany).
Abstract –DE 1 931 661; Jan. 21, 1971; Siemens AG, D–1000 Berling und D–8000 München (Germany).
Abstract –BE 756 853; Sep. 30, 1970; Siemens Akteingesellschaft, D–1000 Berling (Germany) und D–8000 München (Germany).

* cited by examiner

Primary Examiner—Tran Nguyen
(74) Attorney, Agent, or Firm—Jacob Eisenberg Siemens AG

(57) ABSTRACT

An electric motor is provided with rotor and stator. The stator includes stator poles radially facing the rotor and surrounded by stator windings. An insulating sleeve is positioned between the rotor and stator. The sleeve includes projections arranged radially with respect to the rotor. The projections project in a direction away from the sleeve and rotor and towards the stator. The projections project between adjacent stator poles and may further serve to anchor the poles. The projections may have a T or elongated T shape. The projections and sleeve are rigid and either or both may be made of plastic. The sleeve provides a moisture or liquid tight insulation for the stator so that the motor can be used in moist or liquid environments.

19 Claims, 3 Drawing Sheets

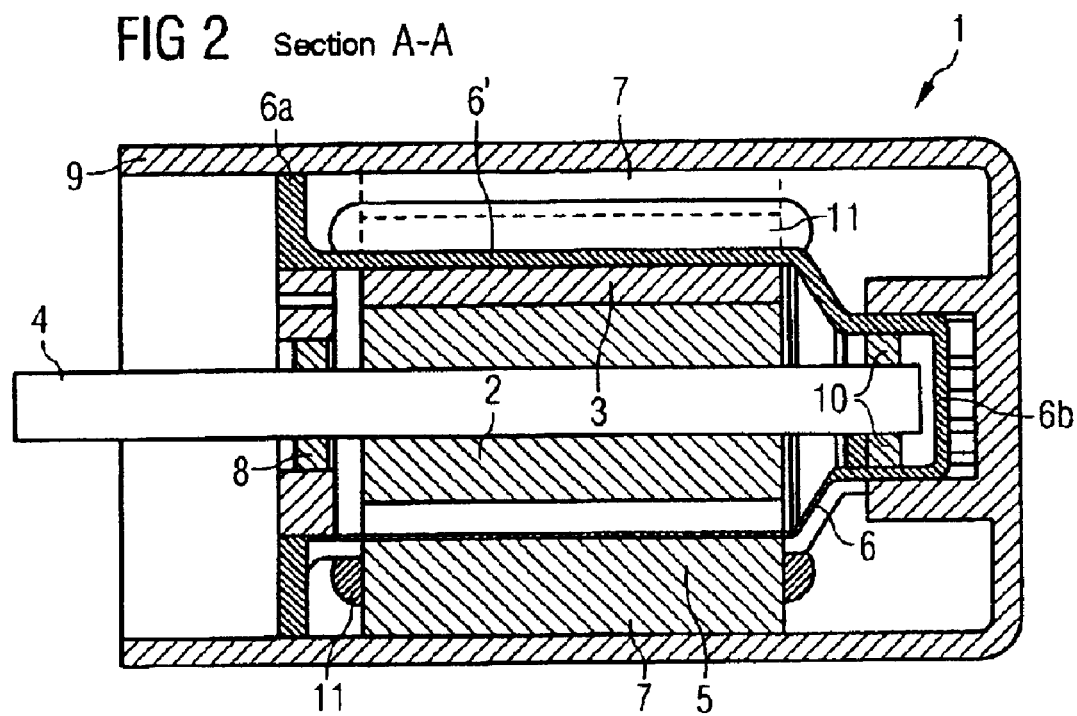
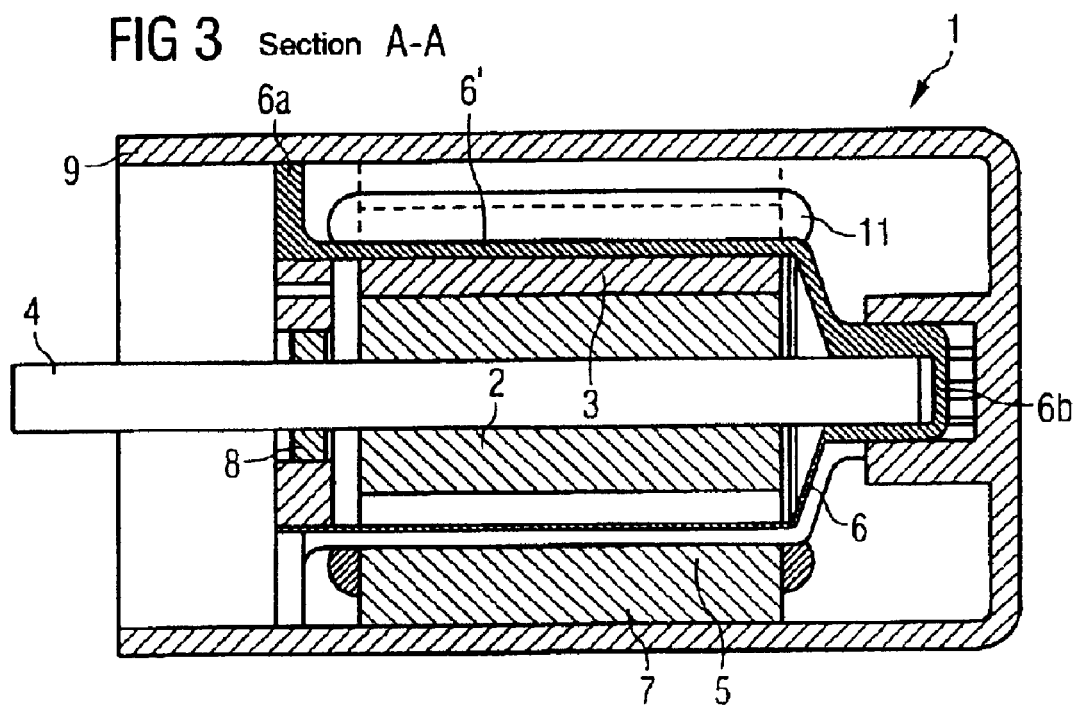

ELECTRIC MOTOR HAVING A MULTIPOLE ROTOR AND A MULTIPOLE STATOR

CONTINUATION DATA

The present invention claims priority to German Patent Application 10226976.9, filed Jun. 17, 2002, which is herein incorporated by reference.

BACKGROUND OF THE INVENTION

The present invention relates to an electric motor having a multipole rotor and a multipole stator. Electric motors are well known. DE 198 46 498 A1 discloses an electric motor, in particular a brushless d.c. motor, which has a multipole rotor and a multipole stator. In the case of this electric motor, the stator poles are connected to one another on a side facing the rotor by means of an insulating material. The stator poles are arranged at a distance from one another on their side facing away from the rotor. The insulating material serves the purpose of significantly reducing the magnetic flux between the stator poles. The insulating material may be designed in this case as a molding. Electric motors are often used in a liquid medium and/or wet environment. Herein, liquid medium penetrates the electric motor, resulting in damage and adverse effects upon operation. A need therefore exists for an electric motor which can operate in a liquid medium without denigration of performance.

BRIEF SUMMARY OF THE INVENTION

An object on which the invention is achieved by an electric motor having a multipole rotor and a multipole stator having stator poles radially facing the rotor and surrounded by stator windings. The motor includes an insulating sleeve, which extends at least over the length of the rotor and has projections arranged radially with respect to the rotor. The sleeve is arranged between the stator and the rotor. At least one projection is arranged between two adjacent stator poles. Both sleeve and projection may be rigid and either or both may comprise plastic. Suitable electric motors here are synchronous or asynchronous motors and brushless d.c. motors. In this case, the rotor is mounted on a rotor shaft. The insulating sleeve is of rigid design and its form therefore remains stable. It is advantageously made of plastic and has a wall thickness of 0.5 to 1 mm. At least one projection may be arranged between two adjacent stator poles. This mechanically reinforces the insulating sleeve and makes it possible for it to be fixed in a compact manner. The projections may be used to anchor the stator poles. It is advantageous here that only the rotor comes into contact with the liquid medium, whereas the stator is prevented from coming into contact with the liquid medium. Accordingly, the electric motor is kept from being damaged by the liquid medium which comes into contact with the rotor.

A preferred configuration of the invention comprises the sleeve running continuously over the length of the stator. This results in the unit, comprising the stator and the insulating sleeve, being particularly robust.

In accordance with a further preferred embodiment of the invention, the projections have a T-shaped cross section. This makes it possible to achieve a particularly robust connection between the insulating sleeve and the stator.

According to a further embodiment of the invention, the projections are formed for the purpose of fixing the stator poles. This is achieved by widening the T-shaped cross section of the individual projections. This advantageously provides a means of a fixing or anchoring of the stator poles which facilitates the provision of the stator poles in the stator of the electric motor.

In accordance with a further preferred embodiment of the invention, the insulating sleeve is connected at at least one of its ends to the casing of the electric motor. The electric motor may thus particularly advantageously be compact, and the insulating sleeve benefits from an additional fixing means.

According to a further preferred embodiment of the invention, the insulating sleeve comprises a cup-like form. This form makes it easier to mount the insulating sleeve on the rotor shaft.

A further embodiment of the invention is one in which the insulating sleeve bears directly against the rotor shaft. The insulating sleeve then also advantageously performs the function of a bearing for the rotor shaft.

According to a further embodiment of the invention, a bearing is arranged between the insulating sleeve and the rotor shaft. This advantageously improves the operating conditions in cases in which the liquid medium is at relatively high pressures, since the insulating sleeve is thus more robust.

In accordance with a further preferred embodiment of the invention, the stator poles and the magnetic return path ring are provided as an individual part. The stator poles and the magnetic return path ring, which together form the actual stator, may thus advantageously be produced in a relatively simple manner.

BRIEF DESCRIPTION OF THE SEVERAL VIEWS OF THE DRAWINGS

The novel features believed characteristic of the invention are set out in the claims below. The invention itself, however, as well as other features and advantages thereof, are best understood by reference to the detailed description, which follows, when read in conjunction with the accompanying drawing, wherein:

FIG. 2 depicts a section through the electric motor along the section line A—A of FIG. 1;

FIG. 3 depicts a section of the electric motor according to another embodiment of the present invention;

DETAILED DESCRIPTION OF THE INVENTION

Figure 1:
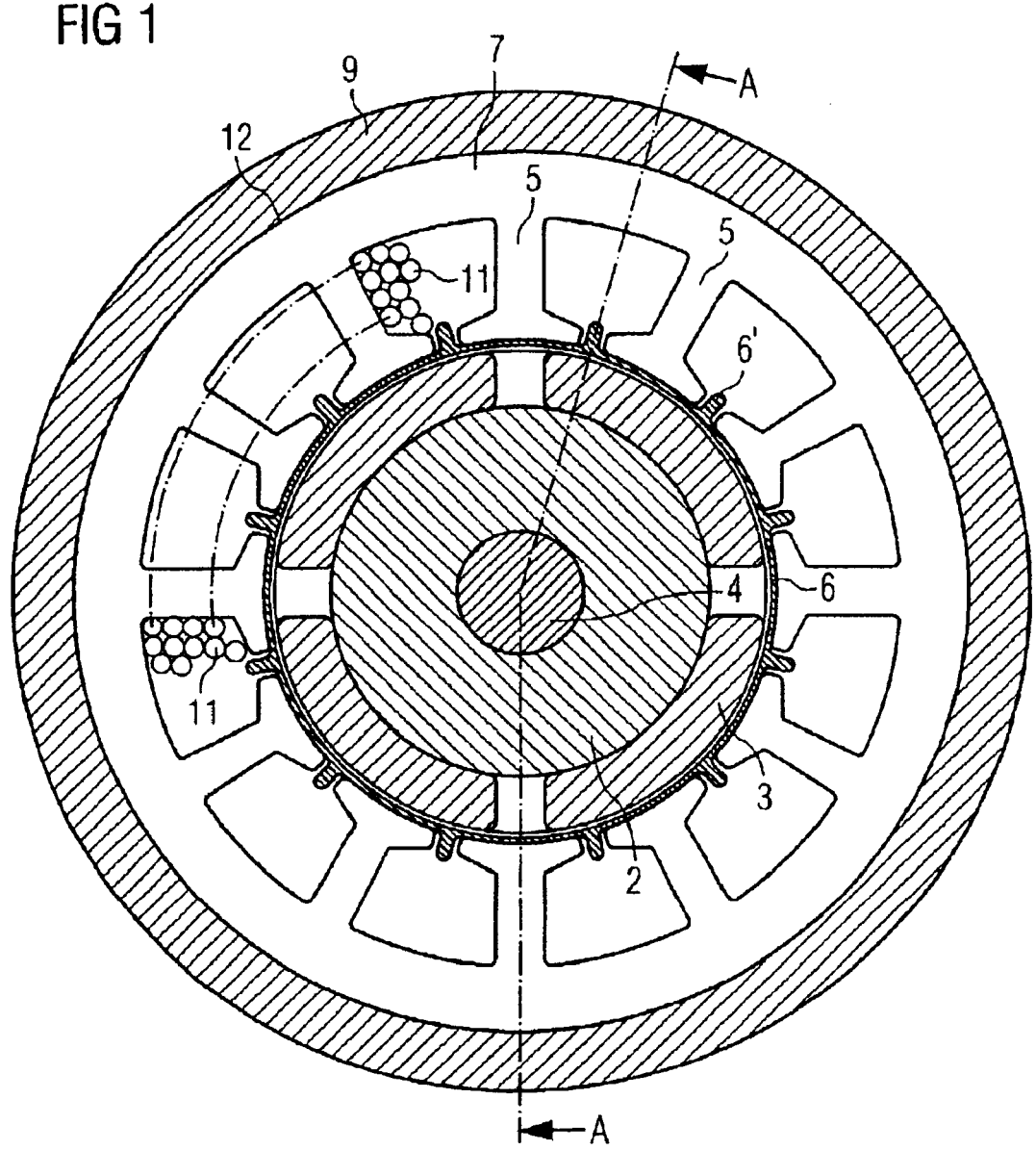
FIG. 1 depicts a cross section through the electric motor.

FIG. 1 depicts a first embodiment of the present invention comprising an electric motor 1 having a multipole rotor 2 and a multipole stator 12 having stator poles 5 extending from the stator in the direction of the rotor. The stator poles radially face rotor 2 and are surrounded by stator windings 11. The stator poles 5 and the magnetic return path ring 7 together form the stator 12 and may be produced as an individual part for ease of expense and engineering. An insulating sleeve 6 covers the length of rotor 2. The sleeve 6 may be made of a rigid material and/or design. Such material may include plastic. The sleeve comprises a wall thickness of 0.5 to 1 mm. The sleeve 6 comprises projections 6' arranged radially about rotor 2 and between stator 12 and rotor 2. As depicted, each of the projections 6' are arranged between two adjacent stator poles 5. Projections 6' may have a quasi-rectangular cross section.

The rotor 2 is arranged on the rotor shaft 4. The casing 9 of the electric motor 1 is located around the magnetic return path ring 7. For reasons of clarity, only one stator winding 11 is depicted. Also for reasons of clarity, the stator poles 5 and the magnetic return path ring 7 are unhatched in the figure.

Magnet shells 3, on rotor 2, are arranged between insulating sleeve 6 and rotor 2. As a result, rotor 2 may be operated without substantial difficulty in a liquid medium, the liquid unable to enter the region of the stator 12 as a result of the provision of the insulating sleeve 6.

FIG. 2 depicts a cross section of electric motor 1 along section line A—A. Insulating sleeve 6 is depicted connected at one of its ends 6a to casing 9 of electric motor 1. The connection advantageously effects the process of affixing the insulating sleeve 6. As depicted, the sleeve comprises a cup or cup like shape 6b. This advantageously effects the process of affixing insulating sleeve 6 to shaft 4. A set of bearings 10 is arranged between the insulating sleeve 6 and the rotor shaft 4. The bearings are particularly advantageous if the pressure of the liquid medium is rather high and a correspondingly high mechanical load is be placed upon insulating sleeve 6. An opposing bearing set 8 is fixed on the other side of an end frame. The stator poles 5 and the magnetic return path ring 7 are in this case produced as individual parts and bear against the casing 9 of the electric motor 1.

FIG. 3 depicts a cross sectional view of another embodiment of the present invention. In contrast to FIG. 2, the insulating sleeve 6 bears down directly upon rotor shaft 4. Here. the insulating sleeve 6 also performs the function of a bearing set, in addition to the function of isolating the stator from a liquid medium (not shown). It is therefore unnecessary to provide a bearing set. This embodiment finds application if the liquid medium is subject to low or no pressure.

Figure 4:
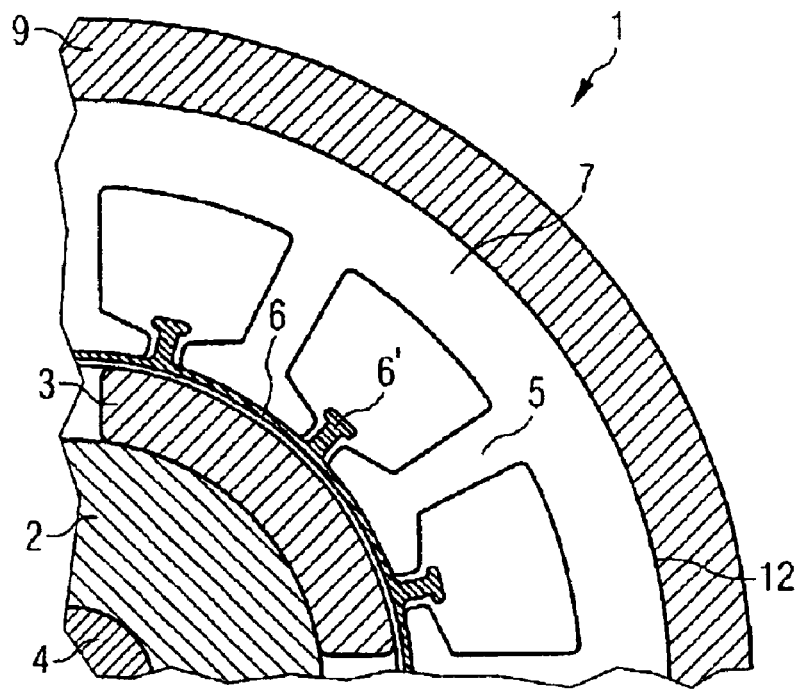
FIG. 4 depicts a cross section of the electric motor with projections having a first shape.

FIG. 4 depicts a cross section of electric motor 1. Here, projections 6' comprise a T-shaped cross section. The projection shape includes a positive effect on the mechanical robustness of the insulating sleeve 6. The stator poles 5 and the magnetic return path ring 7 are in this case likewise provided as an individual part.

Figure 5:
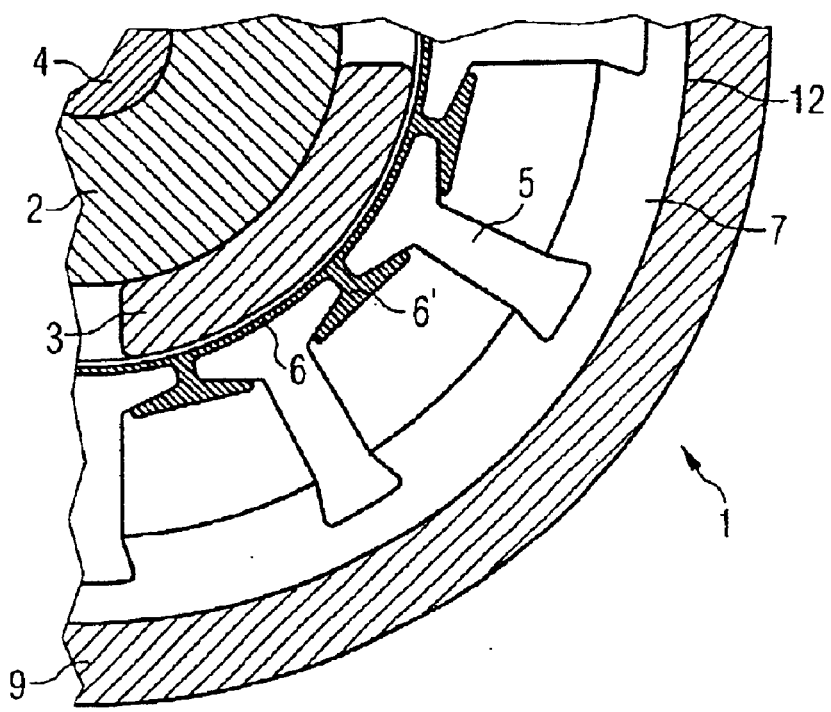
FIG. 5 depicts a cross section of the electric motor with projections having a second shape.

FIG. 5 depicts another cross section of electric motor 1. Here, projections 6' comprise elongated T-shaped cross sections which serve as a support for the stator poles 5. This is achieved by widening the T-shaped cross section. This configuration of the projections 6' furthermore advantageously effects the process of fixing the insulating sleeve 6 to the stator poles 5 and at the same time improves the robustness of the insulating sleeve 6. Furthermore, the stator poles 5 can be fixed in the magnetic return path ring 7 more easily. The stator poles 5 and magnetic return path ring 7 are not produced as an individual part in this case.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

I claim:

1. An electric motor, comprising:

a multipole rotor;

a multipole stator positioned about said rotor, said stator comprising a plurality of adjacent stator poles extending in a direction away from said stator and towards said rotor; and an insulating sleeve positioned between said rotor and stator, said sleeve comprising a plurality of projections radially arranged about said rotor such that each of said projections extends in a direction away from said rotor and in between adjacent stator poles.

2. The electric motor according to claim 1, wherein said sleeve is rigid.

3. The electric motor according to claim 1, wherein said sleeve comprises plastic.

4. The electric motor according to claim 1, wherein said projections are rigid with substantially rectangular cross sections.

5. The electric motor according to claim 4, wherein said projections comprise a T shape.

6. The electric motor according to claim 4, wherein said projections comprise an elongated T shape such that an elongated portion of said elongated T shape extends between adjacent stator poles.

7. The electric motor according to claim 6, wherein said projections anchor said adjacent stator poles.

8. The electric motor according to claim 1, wherein said projections comprise plastic.

9. The electric motor according to claim 1, wherein said sleeve comprises a wall thickness of 0.5 to 1 mm.

10. The electric motor according to claim 1, wherein said sleeve encases said rotor.

11. The electric motor according to claim 1, wherein said sleeve is moisture tight.

12. The electric motor according to claim 1, wherein said sleeve is liquid tight.

13. The electric motor according to claim 1, further comprising a casing for said motor and wherein an end of said insulating sleeve is connected to said casing.

14. The electric motor according to claim 1, wherein a portion of said insulating sleeve comprises a cup shape.

15. The electric motor according to claim 1, wherein said insulating sleeve directly contacts said rotor shaft.

16. The electric motor according to claim 15, further comprising a bearing arranged between said insulating sleeve and said rotor shaft.

17. The electric motor according to claim 1, wherein said stator further comprises a magnetic return path ring, and wherein said adjacent stator poles and path ring are formed as individual elements.

18. The electric motor according to claim 1, further comprising a plurality of windings encircling one or more adjacent stator poles.

19. The electric motor according to claim 1, further comprising at least one magnetic shell positioned between said rotor and said sleeve.

* * * * *